(12) United States Patent
Tan

(10) Patent No.: US 7,698,816 B2
(45) Date of Patent: Apr. 20, 2010

(54) METHOD OF MAKING A PINION MESHING WITH A GIVEN FACE GEAR IN ACCORDANCE WITH ALTERED DESIGN PARAMETERS

(75) Inventor: Jie Tan, Draper, UT (US)

(73) Assignee: The Boeing Company, Chicago, IL (US)

( * ) Notice: Subject to any disclaimer, the term of this patent is extended or adjusted under 35 U.S.C. 154(b) by 967 days.

(21) Appl. No.: 11/472,980

(22) Filed: Jun. 22, 2006

(65) Prior Publication Data

US 2007/0295130 A1    Dec. 27, 2007

(51) Int. Cl.
*B21D 53/28*    (2006.01)
*B21K 1/30*    (2006.01)
*B23P 15/14*    (2006.01)

(52) U.S. Cl. .................. 29/893.35; 451/47; 74/417

(58) Field of Classification Search ............. 29/893, 29/893.3, 893.31, 893.32, 893.33, 893.34, 29/893.35; 451/47; 74/417
See application file for complete search history.

(56) References Cited

U.S. PATENT DOCUMENTS

| 5,941,124 A | 8/1999 | Tan |
| 6,602,115 B2 | 8/2003 | Tan |
| 7,191,521 B2 * | 3/2007 | Litvin et al. ............... 29/893.3 |
| 7,426,777 B2 * | 9/2008 | Nagata et al. ............... 29/33 R |
| 2005/0115071 A1 * | 6/2005 | Fleytman .................. 29/893.32 |

FOREIGN PATENT DOCUMENTS

| EP | 0227152 A1 | 7/1987 |
| WO | WO 96/12585 A1 | 5/1996 |
| WO | WO 01/01020 A1 | 1/2001 |

OTHER PUBLICATIONS

Patent Act 1977: Search Report under Section 17; Date of search: Sep. 24, 2007; Application No. GB0712058.7.
European Search Report; Date of completion of search: Mar. 24, 1987; Application No. 0227152; 1 page.
International Search Report; Date of completion of search: Dec. 22, 1995; International Application No. PCT/NL 95/00360; 3 pages.
International Search Report; Date of completion of search: Sep. 26, 2000; International Application No. PCT/US 00/17694; 3 pages.

* cited by examiner

*Primary Examiner*—David P Bryant
*Assistant Examiner*—Sarang Afzali
(74) *Attorney, Agent, or Firm*—Harness, Dickey & Pierce, P.L.C.

(57) ABSTRACT

A method of defining a new pinion for use with a given face gear set. Tooth geometry of the new pinion is generated by a plane taking the given face gear set as reference and maintaining true conjugate actions among the original pinion, the face gear, the new pinion and the generating plane. This method makes it possible to eliminate adapter gears for applications requiring different shaft settings and/or ratios than those of the given gear set.

5 Claims, 3 Drawing Sheets

METHOD OF MAKING A PINION MESHING WITH A GIVEN FACE GEAR IN ACCORDANCE WITH ALTERED DESIGN PARAMETERS

FIELD

The present disclosure relates to face gear sets and more particularly (but not exclusively) to a pinion capable of meshing in true conjugate action with the face gear member of a given face gear set at a shaft setting and/or ratio different from the shaft setting and/or ratio of the given face gear set.

BACKGROUND

The statements in this section merely provide background information related to the present disclosure and may not constitute prior art.

In a typical helicopter transmission utilizing face gears, two or more input pinions transfer power from two or more engines to a combining face gear. The face gear combines and delivers the power to the main rotor of the helicopter. It can be desirable to use an additional power take-off pinion to provide power from the face gear to a tail rotor and/or accessories of the helicopter. However, the shaft setting and ratio of a power take-off pinion relative to the face gear that would be optimal for transferring power to a tail rotor and/or accessories are frequently different from the shaft setting and ratio of the input pinion relative to the face gear. In such cases, an adapter gear set is needed. Using adapter gears typically results in increased part count, weight, noise and costs.

SUMMARY

The present disclosure, in one implementation, is directed to a method of defining a new pinion for use with a given face gear set. The face gear set includes a face gear and an original pinion that meshes with the face gear in accordance with at least one design parameter different from a corresponding design parameter of the new pinion relative to the face gear. The method includes conceptually mounting a rack for generating the original pinion onto the original pinion at a reference position in which the original pinion and the new pinion mesh with the face gear. A theoretical plane is used to emulate the rack at the reference position. The theoretical plane, the new pinion, the face gear and original pinion are moved in concert to define teeth for the new pinion.

In another implementation, a face gear set includes a face gear and an original pinion that meshes with the face gear. The face gear set also includes a new pinion different from the original pinion and that meshes with the face gear in accordance with at least one design parameter different from a corresponding design parameter of the original pinion. The new pinion has a tooth surface defined by a theoretical plane maintaining tangency contact with the original pinion during rotation and translation of the plane over a meshing area of the original pinion with the face gear and during rotation of each of the face gear, original pinion and new pinion at constant speed about its axis of rotation.

In yet another implementation, the disclosure is directed to a method of making a new pinion for use with a given face gear set that includes a face gear and an original pinion that meshes with the face gear. An axis of the original pinion is theoretically rotated about an axis of the face gear, while the face gear is kept fixed, to a reference position where a meshing area of the given face gear set and a meshing area of the face gear with the new pinion substantially coincide. A taper angle of the new pinion is defined such that a projection of a blank of the new pinion along a circumferential direction of the face gear is substantially the same as a projection of the original pinion blank along the circumferential direction of the face gear. A cutting plane of a cutting tool is positioned at the reference position. The cutting plane is moved to maintain theoretical tangency contact between the cutting plane and the original pinion while the original pinion undergoes a two-parameter rotation, while the new pinion is rotated about its own axis, while the face gear is rotated about its own axis, and while the cutting plane undergoes compound rotation and translation to form the new pinion.

In still another implementation, the disclosure is directed to a new pinion for use with a given face gear of a face gear set that includes an original pinion. The new pinion includes an outer shape, tooth depth and tooth geometry such that the new pinion meshes with the face gear in true conjugate action at a shaft angle, shaft offset and rotation ratio at least one of which is different from that of the original pinion. The new pinion meshes with the face gear in accordance with:

$$\frac{\varphi_{p'}}{\varphi_g} = \frac{N_g}{N_{p'}}$$

where $\phi_{p'}$ represents an angle of rotation of the new pinion about its own axis, $\phi_g$ represents an angle of rotation of the face gear about its own axis, $N_g$ represents a number of teeth on the face gear, and $N_{p'}$ represents a number of teeth on the new pinion.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1A:
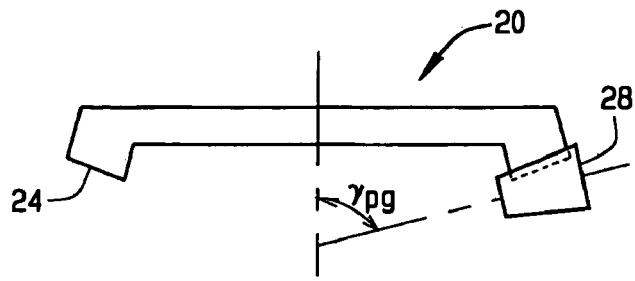
FIG. 1A is a side view of a face gear set including a face gear and pinion of the prior art.

The following description is merely exemplary in nature and is not intended to limit the present disclosure, application, or uses. It should be understood that throughout the drawings, corresponding reference numerals indicate like or corresponding parts and features.

In various implementations of the disclosure, for a given face gear set including a face gear and a pinion, a new pinion can be designed and produced which is capable of meshing with the face gear at a shaft angle, shaft offset and/or transmission ratio that can be different from those of the given face gear set. The new pinion can include a plurality of teeth having the same shapes, each tooth having a pair of spaced-apart flank surfaces. The new pinion can mesh with the given face gear with true conjugate action. That is, the face gear and new pinion can maintain tangency contact between their corresponding tooth flanks while rotating about their respective axes of rotation at constant ratio for transmitting rotational motion and power.

In various implementations of the present disclosure, a method of making a pinion for use with a given face gear set includes using design and motion of a original pinion relative to the face gear to obtain the design, tooth geometry and motion of a new pinion relative to the face gear. The new pinion is formed, e.g., cut, in accordance with setting and motion parameters of the new pinion.

It should be noted that the terms "original pinion" and "new pinion" are used to distinguish a pre-existing pinion from a pinion defined relative to such pre-existing pinion in accordance with the disclosure. In accordance with the present disclosure, with reference to the original pinion, different new pinions can be designed and formed that mesh with the same face gear at respective settings and ratios to meet various application requirements. It also should be noted that the terms "cut", "cutting" and the like include not only cutting, but also grinding, milling and/or any other appropriate method of forming a gear. Thus the term "cutting tool" is used to refer to any one or more of a variety of tools that may be used to form a pinion in accordance with the disclosure.

Figure 1B:
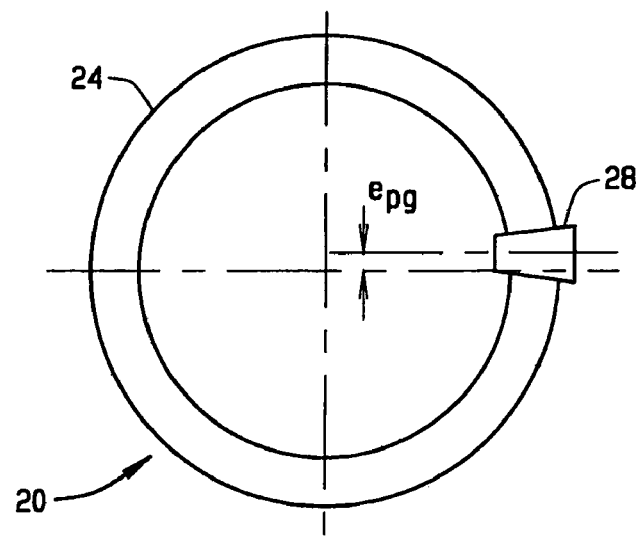
FIG. 1B is a bottom view of the face gear set shown in FIG. 1A.

The foregoing method shall now be described with reference to a face gear set indicated generally by reference number 20 in FIGS. 1A and 1B. The gear set 20 includes a face gear 24 and one or more conical involute pinions 28, one pinion 28 (at times referred to as an "original pinion") being shown in FIGS. 1A and 1B. Such a face gear set is described in Tan, U.S. Pat. No. 5,941,124, entitled "Face Gearing With Conical Involute Pinion", the disclosure of which is incorporated herein by reference. Design parameters of the face gear set 20 include but are not necessarily limited to the following:

$P_d$—diametral pitch.

α—pressure angle; two sides of a tooth can be different if desired.

ψ—skew angle of teeth.

δ—half-cone, or taper, angle of the pinion 28.

$N_p$—number of teeth on the pinion 28.

$N_g$—number of teeth on the face gear 24.

$\gamma_{pg}$—shaft angle of the gear set 20.

$e_{pg}$—shaft offset of the gear set 20.

A rotation ratio of the gear set 20 is calculated in accordance with:

$$i_{pg} = \frac{N_g}{N_p} \qquad (1)$$

A new pinion is typically defined with reference to design parameters of an original pinion. Parameters of the resulting new pinion, however, will depend, e.g., on the shaft angle, shaft offset and/or rotation ratio specified for the new pinion. In some implementations of the present disclosure, one or more design parameters for the gear set 20 may be set to one or more values which yield particular cases of a face gear set. For example, a conical involute pinion may be simplified to a spur (ψ=0) or helical (ψ≠0) involute pinion with δ=0. A gear set having intersecting axes may be described by setting $e_{pg}$ equal to zero. Setting $\gamma_{pg}$ equal to zero is descriptive of a parallel shaft gear set with external mesh, and setting $\gamma_{pg}$ equal to 180° is descriptive of a parallel shaft gear set with internal mesh.

Where the tooth surface of a pinion is an involute helicoid, base radius $r_p^{(b)}$ and base helix angle $\psi_p^{(b)}$ of the involute helicoid can be calculated, as known in the art, based on pinion design parameters in accordance with the geometrical properties of the conical involute gear.

Figure 2A:
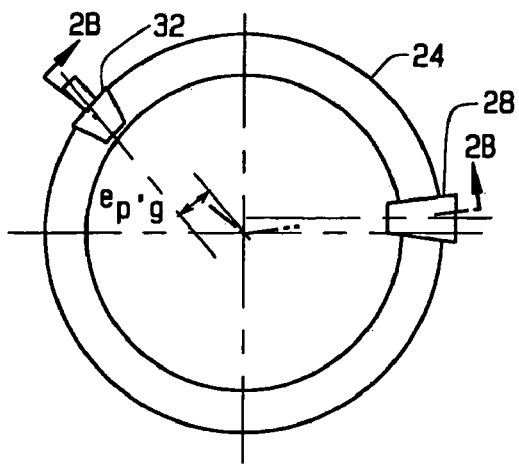
FIG. 2A is a bottom view of a face gear set including a new pinion arranged in accordance with one implementation of the disclosure.

One or more new pinions different from the original pinion 28 can be designed and formed in accordance with various implementations of the disclosure to mesh with the face gear 24. For example, a new pinion, indicated in FIGS. 2A and 2B by reference number 32, is arranged for operation with the gear set 20. Geometry of the new pinion 32 can be defined as follows. The new pinion 32 has a number of teeth $N_{p'}$ and can be defined, as described below, to mesh with the face gear 24 at a shaft angle $\gamma_{p'g}$ and a shaft offset $e_{p'g}$. One or more of the design parameters $N_{p'}$, $\gamma_{p'g}$ and/or $e_{p'g}$ may be different from the corresponding design parameters $N_p$, $\gamma_{pg}$ and $e_{pg}$ of the face gear set 20 and the original pinion 28. The shaft offset $e_{p'g}$ of the new pinion 32 may be zero or non-zero, and shaft angle $\gamma_{p'g}$ may be equal to or not equal to 90°.

The new pinion 32 has a rotation ratio with the face gear 24:

$$i_{p'g} = \frac{N_g}{N_{p'}} = \frac{\varphi_{p'}}{\varphi_g} \qquad (2)$$

where $\phi_{p'}$ represents an angle of rotation of the new pinion 32 about its own axis, and $\phi_g$ represents an angle of rotation of the face gear 24 about its own axis.

Design and tooth geometry of the original pinion 28 as well as its settings and motion relative to the face gear 24 may be used to obtain the design and tooth geometry of a new pinion 32 in the following manner. It should be noted that the original pinion 28 and face gear 24 are used as theoretical references and are not physically present in the actual forming of the new pinion as disclosed herein. Generally, a rack for generating the original pinion 28 is conceptually mounted onto the original pinion 28 at a reference position in which the original pinion 28 and the new pinion 32 mesh with the face gear 24. A theoretical plane is used to emulate the rack at the reference position. The theoretical plane, the new pinion 32, the face gear 24 and the original pinion 28 are moved in concert to define teeth for the new pinion 32.

Figure 2B:
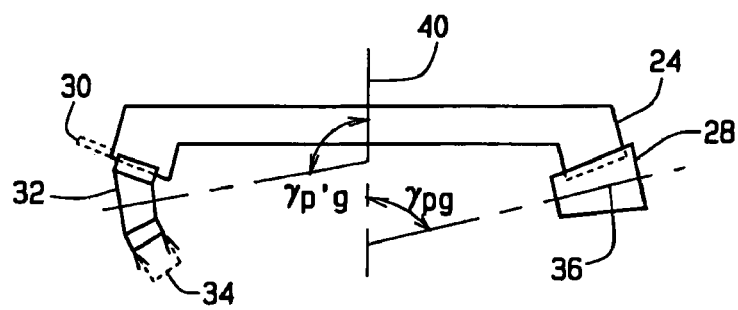
FIG. 2B is a side view, taken in the direction indicated in FIG. 2A by arrows 2B-2B, of the face gear set and new pinion shown in FIG. 2A.
Figure 3:
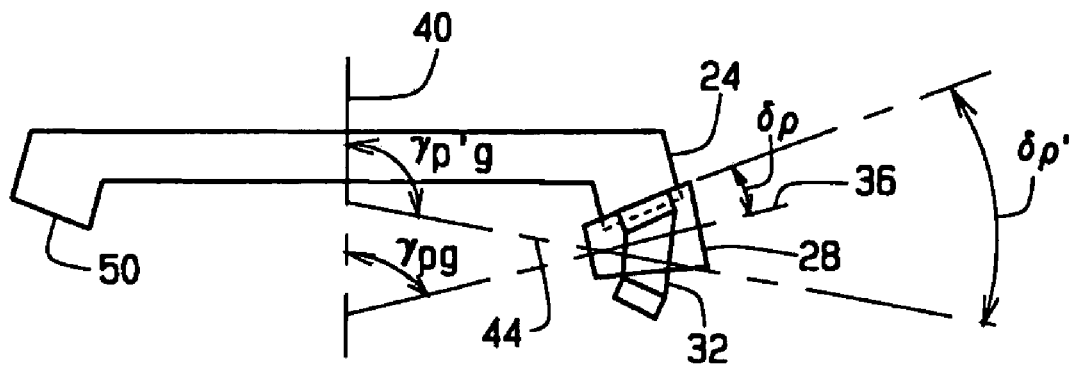
FIG. 3 is a schematic diagram of one aspect of defining a new pinion with reference to an original pinion and face gear in accordance with one implementation of the disclosure.

Referring now to FIG. 2B, the new pinion 32 can be designed with reference to the original pinion 28 by rotating the axis 36 of the original pinion 28 about the axis 40 of the face gear 24 while keeping the face gear 24 fixed and maintaining correct tooth meshing. The original pinion axis 36 is rotated until it reaches a position in which a meshing area of the original face gear set 20 substantially coincides with a meshing area of the new pinion 32 with face gear 24, as shown in FIG. 3. Specifically, a taper angle $\delta_{p'}$ of a blank (i.e., outer shape) of the new pinion 32 is determined such that its projection along the circumferential direction of the face gear 24 is substantially the same as the circumferential projection of the original pinion 28 blank. Additionally, tooth orientation of the new pinion 32 on its blank is designed to have the same projection onto the face cone of the face gear 24 as a projection of the original pinion 28 tooth orientation.

Figure 4:
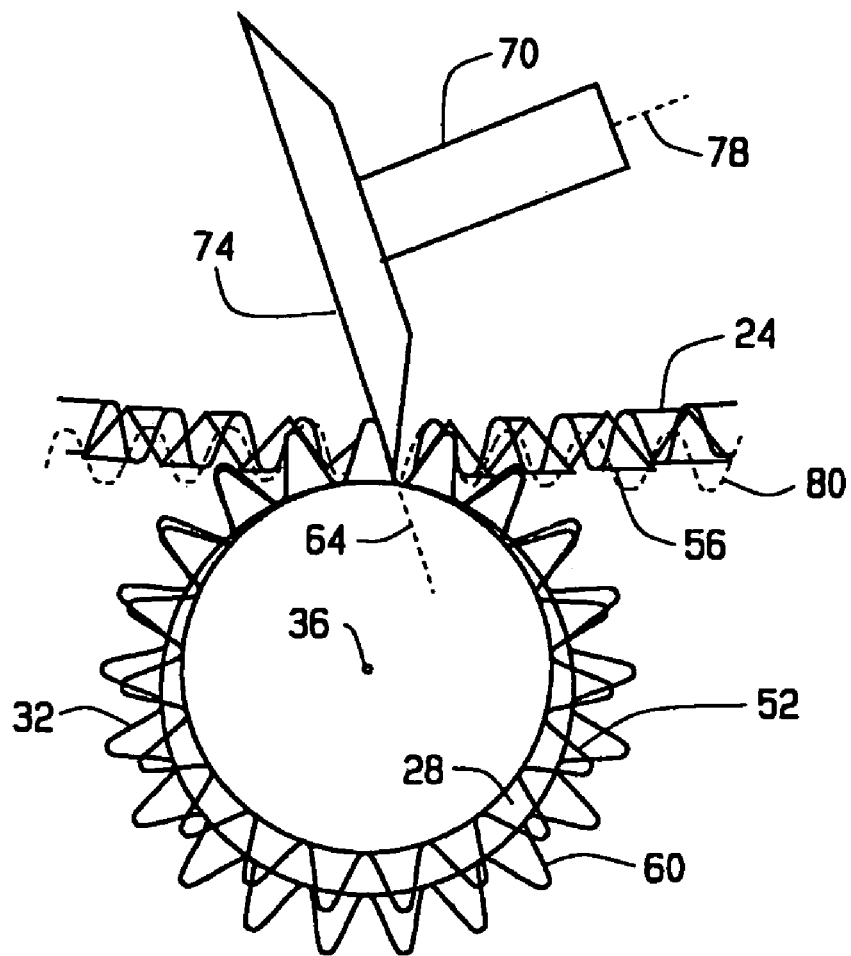
FIG. 4 is a schematic diagram of one aspect of using a plane to define and/or form a new pinion with reference to an original pinion and face gear in accordance with one implementation of the disclosure.

FIG. 4 is a schematic diagram of one aspect of defining, generating and/or cutting a new pinion with reference to an original pinion and face gear in accordance with one implementation of the disclosure. Teeth 52 of the original pinion 28 mesh with teeth 56 of the face gear 24. Tooth flanks 60 of the new pinion 32 may be defined in a generating process by a theoretical plane 64 whose positioning and motion are such as to maintain tangency contact with the original pinion 28 over its meshing area with the face gear 24, as shown in FIG. 4, while the original pinion 28 performs a two-parameter rotation. The conceptual rack for generating the original pinion 28 that is emulated by the plane 64 is indicated by reference number 80. Specifically, the original pinion 28 rotates about its own axis 36 by angle of rotation $\phi_p$ while the axis 36 itself rotates about the axis 40 of the face gear 24. Rotations of the original pinion 28 and the face gear 24 are in accordance with the following relationship:

$$\frac{\varphi_p}{\varphi_g - \varepsilon_p} = \frac{N_g}{N_p} \quad (3)$$

where $\varepsilon_p$ represents an angle of rotation of the axis 36 of the original pinion 28 about the face gear axis 40, and $\phi_p$ represents an angle of rotation of the original pinion 28 about its own axis 36.

In the foregoing manner, true conjugate action is maintained between the original pinion 28 and the face gear 24 in accordance with gearing theory. In the generating process and referring again to FIG. 3, the new pinion 32 is rotated simultaneously about its own axis 44 relative to the face gear rotation as given by equation (2), while compound rotation and translation of the theoretical plane 64 is performed in such a way that the plane rotates about the face gear axis 40 along with the rotation of the axis 36 of the original pinion 28, while at the same time the plane 64 also translates along its own normal in relation to the rotation of the original pinion 28 about its own axis as given by $$\frac{v_b^{(n)}}{\dot{\varphi}_p^*} = r_p^{(b)} \cos\psi_p^{(b)} \quad (4)$$

where $\dot{\phi}_p$ represents angular velocity of the original pinion 28 for its rotation about its own axis 36, $v_b^{(n)}$ represents velocity of the plane 64 along its normal, $r_p^{(b)}$ represents the base radius of the original pinion 28 where its tooth surface is an involute helicoid, and $\psi_p^{(b)}$ represents the base helix angle of the original pinion 28.

The foregoing definition of tooth flank geometry of the new pinion 32 can be implemented to form, e.g., cut, the new pinion 32 as schematically depicted in FIG. 4. A tool 70 may be used which has effective cutting elements that form a cutting plane 74 perpendicular to the axis of rotation 78 of the tool 70. Typical tools for making the new pinion 32 include, e.g., a milling cutter whose cutting edges lie on a plane, and/or a grinding wheel with a flat surface. In a cutting process, a cutting tool and a new pinion are two physical objects which move relative to each other. Referring to FIG. 4, the cutting plane 74 is positioned coinciding with the theoretical plane 64 described above. The original pinion 28 and the face gear 24, which mesh as described by the original face gear set 20 design parameters, serve as installation and motion references for the cutting tool 70 and the new pinion 32.

With the new pinion 32 and the cutting tool 70 installed relative to each other in the way described above, the cutting surface 74, while cutting the new pinion 32, maintains constant tangency contact with the original pinion tooth 52 surface, while rotations of the original pinion 28, the face gear 24 and the new pinion 32 maintain the relationships set forth in Equations (2) and (3). Tooth working depth of the new pinion 32 is designed and cut to be substantially the same as the working depth of the original pinion 28 in regard to meshing with the same face gear 24, although small variations are possible.

The cutting tool 70 is positioned and moved to maintain constant tangency with the tooth surface of the original pinion 28 in the following manner. The cutting tool 70 is initially installed onto the tooth 52 surface of the original pinion 28. The surface normal of the cutting surface 74 is aligned with the surface normal of the tooth 52 surface of the original pinion. The cutting tool 70 is rotated along with the original pinion 28 about the face gear axis 40, while simultaneously translated along the normal of its own cutting surface 74 related to the rotation of the original pinion 28, in accordance with Equation (4).

A cutting process typically includes a plurality of passes, each pass starting with an installation of the cutting plane 74 in tangency contact with the original pinion 28, followed by simultaneous compound motion of the cutting tool 70 and rotation of the new pinion 32 as related to the theoretical rotations of the original pinion 28 and the face gear 24. Tooth surface accuracy generally increases with the number of passes, a typical number of passes being about fifty (50) for high-precision aerospace applications. Initial installations of the cutting tool 70 preferably cover a working depth of the mesh between the new pinion 32 and the face gear 24 plus an amount for tip-root clearance in accordance with industry common practice for complete machining of the whole tooth surface of the new pinion 32.

Relative motions between the cutting tool 70 and the new pinion 32 may be implemented using a multi-axis computer numerical control (CNC) machine. For a selected CNC machine, relative motions between the cutting tool 70 and the new pinion 32 in accordance with this disclosure can be converted to a numerical control (NC) program by means of commercially available computer aided manufacturing (CAM) software packages. The NC programs can be executed to physically move the cutting tool 70 and a new pinion blank for the machining of the new pinion 32.

The blank of the new pinion 32 is typically that of a cone but could be a cylinder, dependent on similarity of circumferential projection of the original pinion 28 and the new pinion 32 at their respective shaft angles and shaft offsets with respect to the face gear 24. Tooth orientation on the new pinion 32 blank is typically skew, but could be parallel to the axis of rotation, as determined by projection of the face gear tooth 56 orientation onto the new pinion 32 blank mounted at the desired shaft angle and shaft offset with respect to the face gear 24. Referring to FIG. 2B, tooth depth 30 of the new pinion 32 is typically constant across the face width of a tooth 60, conforming to a parallel tooth depth of the given face gear set 20. Tooth face width 34 of the new pinion 32 blank is designed based on load capacity requirement and meshing limitations with the face gear, usually different from that of the original pinion 28.

Various implementations of the disclosure can be used in helicopter drive systems utilizing face gears for one or more stages in which rotating power input is transferred from an input pinion to a face gear at a given shaft angle, shaft offset and ratio. Power can be transferred from the face gear to a tail rotor and accessory drive directly by one or more pinions whose tooth geometry is different from the input pinions and meshes with the face gear with true conjugate action. Such meshing can be at a shaft angle, offset and/or ratio which can be different from the shaft angle, offset and/or ratio between input pinion and face gear.

Figure 5A:
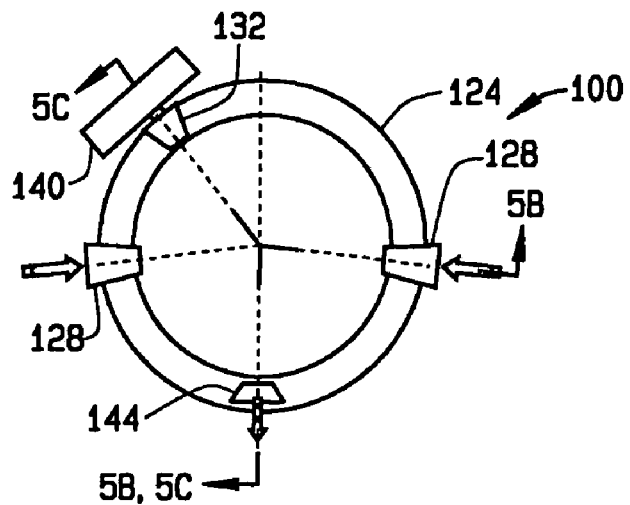
FIG. 5A is bottom view of a face gear set included in a helicopter drive system in accordance with one implementation of the disclosure.
Figure 5B:
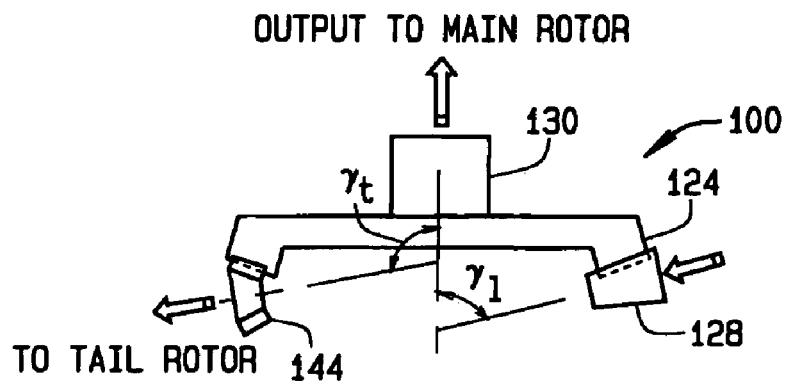
FIG. 5B is a side view, taken in the direction indicated in FIG. 5A by arrows 5B-5B, of the face gear set shown in FIG. 5A.
Figure 5C:
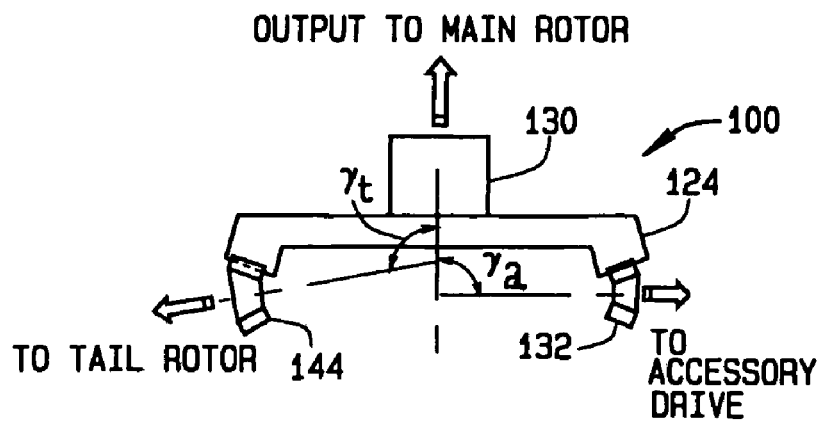
FIG. 5C is a side view, taken in the direction indicated in FIG. 5A by arrows 5C-5C, of the face gear set shown in FIG. 5A.

One configuration of a helicopter drive system in accordance with one implementation of the disclosure is indicated generally in FIGS. 5A-5C by reference number 100. The drive system 100 includes a bull face gear 124 and a pair of input pinions 128 which receive power from two engines. The face gear 124 combines power from the input pinions 128 and provides power through an output shaft 130 to a main rotor (not shown). A power takeoff pinion 132 provides power from the face gear 124 to an accessory drive 140 for accessories. A power takeoff pinion 144 provides power from the face gear 124 to a tail rotor (not shown). In the present exemplary configuration, the power takeoff pinions 132 and 144 can have different shaft angles, offsets and/or ratios from each other and/or from the input pinions 128. For example, as shown in FIG. 5B, the takeoff pinion 144 has a shaft angle $\gamma_t$ different from a shaft angle $\gamma_l$ of the input pinion 128. Further, as shown in FIG. 5C, the takeoff pinion 132 has a shaft angle $\gamma_a$ different from shaft angles $\gamma_t$ and $\gamma_l$. Of course, in some implementations, an original pinion could be other than an input pinion, and a new pinion could be other than a power takeoff pinion. It also is possible for all pinion(s) in use with a face gear to have been made as new pinions. It can be appreciated that there are many possible applications of the disclosure in areas other than helicopter drive systems, including but not limited to drive systems in other vehicles and other types of machinery.

A new pinion designed and formed in accordance with the foregoing methods can mesh with a given face gear at a desired shaft angle, offset and/or ratio different from those of a given original pinion. Implementations of the foregoing methods and systems provide a plurality of design options in face gear set applications. More options can be provided for taking power from a face gear, e.g., to drive accessories, tail rotors and other components of helicopters. Designs can be configured with fewer parts and packaged in smaller envelopes. Implementations of the foregoing methods and systems make it possible to eliminate adapter gears, thereby reducing part count, weight, power loss, noise level and costs, and increasing overall efficiency and reliability.

What is claimed is:

1. A method of making a new pinion for use with a given face gear set that includes a face gear and an original pinion that meshes with the face gear, the method comprising:
theoretically rotating an axis of the original pinion about an axis of the face gear, while keeping the face gear fixed, to a reference position where a meshing area of the given face gear set and a meshing area of the face gear with the new pinion substantially coincide;
defining a taper angle of the new pinion such that a projection of a blank of the new pinion along a circumferential direction of the face gear is substantially the same as a projection of the original pinion blank along the circumferential direction of the face gear;
positioning a cutting plane of a cutting tool at the reference position; and
moving the cutting plane to maintain theoretical tangency contact between the cutting plane and the original pinion while the original pinion undergoes a two-parameter rotation, while the new pinion is rotated about its own axis, while the face gear is rotated about its own axis, and while the cutting plane undergoes compound rotation and translation to form the new pinion.

2. The method of claim 1, performed to obtain a projection of tooth orientation of the new pinion onto a face cone of the face gear that is substantially the same as a projection of tooth orientation of the original pinion onto the face cone.

3. The method of claim 1, wherein to undergo a two-parameter rotation, the original pinion is rotated about its own axis by $\phi_p$ while the original pinion axis is rotated about the face gear axis in accordance with:

$$\frac{\varphi_p}{\varphi_g - \varepsilon_p} = \frac{N_g}{N_p}$$

where $\epsilon_p$ represents an angle of rotation of the axis of the original pinion about the face gear axis, $\phi_p$ represents an angle of rotation of the original pinion about its own axis, $\phi_g$ represents an angle of rotation of the face gear about its own axis, $N_p$ represents a number of teeth on the original pinion, and $N_g$ represents a number of teeth on the face gear.

4. The method of claim 1, wherein the new pinion is rotated about its own axis in accordance with:

$$i_{p'g} = \frac{N_g}{N_{p'}} = \frac{\varphi_{p'}}{\varphi_g}$$

$\phi_{p'}$ represents an angle of rotation of the new pinion about its own axis, $\phi_g$ represents an angle of rotation of the face gear about its own axis, $N_g$ represents a number of teeth on the face gear, and $N_{p'}$ represents a number of teeth on the new pinion.

5. The method of claim 1, wherein the cutting tool performs compound rotation and translation such that the cutting tool:
rotates about the face gear axis along with the rotation of the original pinion axis, and
translates along the normal of the cutting plane in relation to the rotation of the original pinion about its own axis in accordance with:

$$\frac{v_b^{(n)}}{\dot\varphi_p^*} = r_p^{(b)} \cos\psi_p^{(b)}$$

where $\dot\phi_p$ represents angular velocity of the original pinion for its rotation about its own axis, $v_b^{(n)}$ represents velocity of the cutting plane along its normal, $r_p^{(b)}$ represents a base radius of the original pinion, and $\psi_p^{(b)}$ represents a base helix angle of the original pinion.

* * * * *